United States Patent
Price et al.

(10) Patent No.: US 6,462,758 B1
(45) Date of Patent: Oct. 8, 2002

(54) DISPLAY METHOD FOR TIME-ORDERED DYNAMIC LISTS OF DATA

(75) Inventors: Mark T. Price, Redondo Beach, CA (US); Alan Risse, Camarillo, CA (US)

(73) Assignee: Reuters, Ltd., London (GB)

(*) Notice: Subject to any disclaimer, the term of this patent is extended or adjusted under 35 U.S.C. 154(b) by 0 days.

(21) Appl. No.: 09/246,832

(22) Filed: Feb. 8, 1999

Related U.S. Application Data
(60) Provisional application No. 60/074,329, filed on Feb. 9, 1998.

(51) Int. Cl.[7] ............................................. G09G 5/00
(52) U.S. Cl. ........................................ 345/784; 345/785
(58) Field of Search ........................... 345/792, 783–786, 345/790, 736, 969, 700; 709/224

(56) References Cited

U.S. PATENT DOCUMENTS

| | | | |
|---|---|---|---|
| 5,339,392 A | * 8/1994 | Risberg et al. | ............. 345/762 |
| 5,579,472 A | * 11/1996 | Keyworth et al. | .......... 340/7.29 |
| 5,706,449 A | 1/1998 | Liu et al. | .................... 345/700 |
| 5,971,580 A | * 10/1999 | Hall et al. | ..................... 700/83 |
| 6,199,080 B1 | * 3/2001 | Nielsen | ....................... 707/513 |

OTHER PUBLICATIONS

Kadnier, Griffith Wm., "Windows NT 4: The Complete Reference", Chapter 7—The Event Viewer and Performance Monitor, pp. 1–10 of printed pages from the Internet, 1997, The McGraw–Hill Companies.*
MS Excel 97 Splitting Panes/Freezing Rows Screen Dumps (1996).*
Microprocessors and Microsystems, Chapter 37, "Monitoring Events," pp. 1069–1084, 1185–1197 (no date available).
"Common User Access Console Window for Operating System Console," IBM Technical Disclosure Bulletin vol. 40, No. 3, p. 257 (Mar. 1997).

* cited by examiner

Primary Examiner—Sy D. Luu
(74) Attorney, Agent, or Firm—Banner & Witcoff, Ltd.

(57) ABSTRACT

A display method for time-ordered dynamic lists of data including a window for a computer display having a present portion and a past portion. The present portion contains only current data. Any and all historic data is contained in the past portion. The past portion is of a specified length but may be variable and can be reviewed by the user as desired. Whenever the present portion and the past portion of the window do not represent a continuous list of data from the current data to the historic data, a visible indicator is provided to notify the user of this discontinuity.

6 Claims, 4 Drawing Sheets

| C.CN | | | |
|---|---|---|---|
| TIME | VOLUME | PRICE | VWAP |
| 10:35:09 | 500 | 152-1/4 | 152.012 |
| 10:31:03 | 300 | 152-1/4 | 152.011 |
| 10:30:59 | 300 | 152-1/8 | 152.011 |
| 10:30:57 | 500 | 152-1/4 | 152.011 |
| 10:30:39 | 100 | 152-1/4 | 150.010 |
| 10:30:22 | 1,100 | 152-1/4 | 152.010 |
| 10:30:18 | 2,100 | 152-1/4 | 152.010 |
| 10:29:41 | 100 | 152-1/4 | 152.008 |
| 10:29:20 | 200 | 152-1/4 | 152.008 |
| 10:29:18 | 200 | 152-1/4 | 152.008 |
| 10:29:06 | 3,000 | 152-1/4 | 152.008 |
| 10:29:00 | 200 | 152-5/8 | 152.005 |
| 10:28:53 | 2,000 | 152-1/4 | 152.005 |
| 10:28:47 | 1,500 | 152-1/4 | 152.003 |

FIG. 1

DISPLAY METHOD FOR TIME-ORDERED DYNAMIC LISTS OF DATA

CROSS-REFERENCE TO RELATED APPLICATION

This non-provisional application claims priority from provisional U.S. Patent Application Ser. No. 60/074,329 filed Feb. 9, 1998 in the names of Mark T. Price and Alan Risse.

BACKGROUND OF THE INVENTION

1. Field of Invention

The present invention relates generally to the field of graphical user interfaces and pertains more particularly to a display method for time-ordered dynamic lists of data.

2. Discussion of the Prior Art

Since at least as early as the introduction of the Apple® Macintosh® in 1984 and Microsoft® Windows® in 1985, computer users have appreciated and become accustomed to interfacing with their computers using visual means. Graphical user interfaces (GUIs) provide a series of intuitive, colorful, and graphical mechanisms which enable the computer user to view, update, and manipulate information. Utilization by computer manufacturers and software developers of the GUI and the mouse are a substantial reason for the explosion of personal computers worldwide.

A typical computer system contains a computer, a keyboard, an input device such as a mouse, and a display monitor. The computer contains a central processing unit (CPU), static memory such as a hard disc drive, dynamic memory such as random access memory (RAM), and removable memory such as a floppy disc drive or a CD ROM drive. The operating system of the computer and application programs running on the computer generate GUIs that are displayed on the display monitor. These GUIs are commonly referred to as "windows." The display may contain only one window or multiple windows depending on the circumstances and user preferences. In turn, a window may be sized to display all or only a portion of the total information made available for viewing by the program. If the window displays only a portion of the total information, then the user is provided with one or more scroll bars that allow the user to move the display portion to view other portions of the total information.

With the development of computer networking technology and the advent of the Internet, the average computer equipped with a modem, for example, has ceased being a stand alone device and has become a great resource for receiving and collecting information. Networking speeds have become such that dynamic lists of data can practically be distributed simultaneously with the event being documented. Such events could include the weather, the stock market, and the commuter traffic. This speed can be both a blessing and a curse however. This speed is a blessing in the sense that the data is timely and can be acted on almost immediately. This speed is a curse in the sense that the user may become overloaded. People need time to make decisions. The hallmark of human decision making is flexibility. People often need to account for a number of factors beyond the data itself in making their decisions. Accordingly, dynamic lists of data should be provided in a manner which facilitates human decision making.

A definite need exists for a display method for time-ordered dynamic lists of data having an ability to facilitate human decision making. In particular, a need exists for a method which is capable of providing the user with both current and historic data. Ideally, such a system would operate by signifying which information is the current data and providing a mechanism for the user to review the historic data. With a method of this type, dynamic lists of data would provide a manageable source of information upon which to base decisions. A primary purpose of the present invention is to solve these needs and provide further, related advantages.

SUMMARY OF THE INVENTION

A display method for time-ordered dynamic lists of data is disclosed including a window for a computer display having a present portion and a past portion. The present portion contains only current data. Any and all historic data is contained in the past portion. The past portion is of a specified length but may be variable and can be reviewed by the user as desired. Whenever the present portion and the past portion of the window do not represent a continuous list of data from the current data to the historic data, a visible indicator is provided to notify the user of this discontinuity.

BRIEF DESCRIPTION OF THE DRAWING

The above and other objects and advantages of the present invention will be more readily appreciated from the following detailed description when read in conjunction with the accompanying drawing, wherein:

FIG. 1 is a schematic of a window for a computer display that provides time-ordered dynamic lists of data in a manner which facilitates human decision making;

DETAILED DESCRIPTION OF THE PREFERRED EMBODIMENTS

Figure 2:
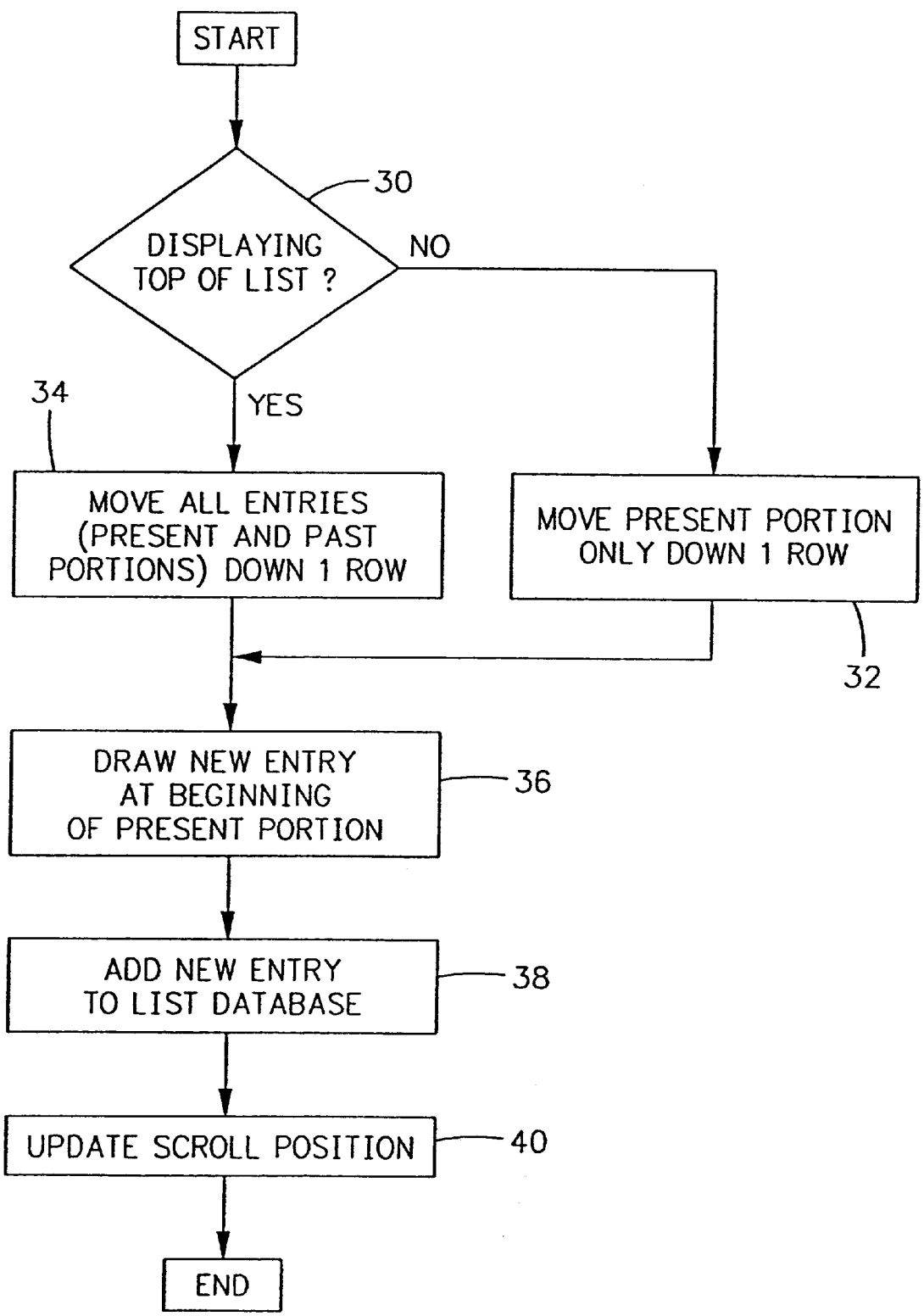
FIG. 2 is a flow diagram of the addition of new data to a time-ordered dynamic list of data in one embodiment of the present invention.

A purpose of the present invention is to provide time-ordered dynamic lists of data in a manner which facilitates human decision making. A dynamic list of data represents a database which includes current data and historic data. The database will have a specified size but may be variable. The list size will vary with the user and the application and either may be limited to a specified number of records or a specified time period. For any given computer system, there will be a practical limit to the list size. Typically, the database will be empty initially and fill up as data is received.

Turning first to FIG. 1, a schematic of a window 10 for a computer display is shown. The window 10 is generated by a program running on the computer. Specifically, the operation of the present invention on one time-ordered dynamic list of stock market data is shown for explanatory purposes. The entries in the window represent the lists of volume, price, and VWAP (Volume Weighted Average Price) data for Citicorp. The data is given in numerical values with the current data at the top of the list and increasingly older data given down the list. One of ordinary skill in the art will realize that any number of other lists of data are possible. Those skilled people will further realize that the data could be represented in any number of ways. The window 10 includes a header portion 12, a present portion 14, and a past portion 16. The window further includes a vertical scroll bar 18 and a horizontal scroll bar 20. The vertical scroll bar includes an up button 18a, a down button 18b, and a thumb button 18c. The horizontal scroll bar includes a left button 20a, a right button 20b, and a thumb button 20c.

The header portion 12 is not strictly required and will depend on the context but typically contains information to identify the window and the data lists to the user. In this case, the header portion identifies the data as being that for C.CN (Citicorp) and the data list columns are shown as being TIME, VOLUME, PRICE, and VWAP.

The present portion 14 of the window 10 displays the current data. In the preferred embodiment of the present invention, the present portion is always shown and will contain at least one record. More than one record may be displayed. The current data represents the most recent data and remains current until more recent data is available. The frequency at which data is made available will depend on the particular application. Often data will be sampled at regular intervals. In the case of weather forecasting for example, outdoor temperature readings may be taken every second. Alternatively, data may be sampled upon the occurrence of a specific event. In this case, that event is a transaction involving Citicorp stock. Specifically, at 10:35:09 a volume of 500 shares of Citicorp stock was traded having a price of 152¼ and a VWAP of 152.012.

The past portion 16 of the window 10 displays the historic data. The historic data represents any and all data that is not the current data and typically includes primarily former current data. The number of entries displayed will vary with the user and the application and either may be limited to a specified number of entries or a specified time period. For any given computer system, there will be a practical limit to the number of entries displayed. In this case, a vertical scroll bar 18 is depicted which indicates that there are more entries available than are being displayed. Here, for example, only thirteen entries are being displayed. Further, the thumb button 18c is depicted as being between the top and the bottom of the range of the vertical scroll bar 18 which implies that entries in a middle portion of the list are being displayed. For reference purposes, the most recent data to the current data in the database will be designated as the first entry and will be referred to as the top of the list when presented vertically from most recent to least recent, as in this example. Likewise, the least recent data will be designated as the last entry and will be referred to as the bottom of the list. Consequently, in this case, the vertical scroll bar indicates that neither the top of the list nor the bottom of the list is being displayed in the example past portion.

One of ordinary skill in the art will recognize that, in this case, a horizontal scroll bar 20 is depicted which indicates that there are more columns available than are being displayed. Here, for example, four columns are being displayed. In addition, the thumb button 20c is depicted as being at the left end of the range of the horizontal scroll bar 20 which implies that columns in a left portion of the list are being displayed. Other columns with other column headers, current data, and historic data must exist but are not being displayed in the example. In one embodiment of the present invention, all of the columns scroll with the horizontal scroll bar. In another embodiment, the time column is always shown while the other columns scroll with the horizontal scroll bar.

From the standpoint of the data, between the present portion 14 and the past portion 16 is a transition in time. What may be uncertain to the user without examining the time column, the vertical scroll bar 18, and the horizontal scroll bar 20, is how much of a transition in time there is between the current data and the upper entry being displayed in the historical data. Depending on the vertical scroll bar, the upper entry being displayed will not necessarily be the first entry. Recall that the first entry is the most recent data to the current data. If the upper entry being displayed is the first entry, then from the standpoint of the data there is no discontinuity in time from the present portion 14 to the past portion 16. Whenever the upper entry being displayed is not the first entry, then there is a discontinuity in time. Such is the case in the example shown. To emphasize this discontinuity, a visible indicator 22 is provided for the user. In a preferred embodiment of the present invention, the visible indicator 22 is exhibited when there is a discontinuity and is removed when there is no discontinuity. Here, for example, the visible indicator 22 is a heavy line, heavier than the other lines, between the present portion and the past portion. One of ordinary skill in the art will realize that any number of visible indicators such as color, shading, or font could also be used. The visible indicator should more immediately alert the user to the discontinuity. The operation of the visible indicator and the display portions will be more fully explained with respect to FIGS. 2–4 below.

As time passes during the collection of the data, periodically new data is received by the computer. This new data is added to the database and displayed in the present portion 14 of the window 10 of FIG. 1 as the current data. The new data displaces what was previously the current data. The data being displaced by the new data is then moved to the historic data portion of the database. Assuming that the database is not infinitely long and that the database is full, this is generally accomplished by discarding the last entry, moving all of the other entries down one place, and inserting the displaced data as the first entry of the historic data portion. How this change in historic data is displayed will depend on the circumstances as will be described below. For discussion purposes, FIGS. 2–4 will rely on the example schematic shown in FIG. 1.

Turning now to FIG. 2, a flow diagram of the addition of new data to a time-ordered dynamic list of data in one embodiment of the present invention is shown. At decision block 30, the program examines the current status of the past portion 16 of FIG. 1 to determine whether the top of the list is shown. When this is not the case and the present portion 14 contains more than one entry, then at block 32 the entries in the present portion only are moved down one row and processing proceeds to block 36. Returning to decision block 30, when the top of the list is shown, then at block 34 all of the entries in both the present portion and the past portion are moved down one row and processing proceeds to block 36. At block 36, the new data is draw into the present portion. Assuming that there are more than one entry in the present portion, then the new entry is drawn at the beginning of the present portion, that is, the most recent position. At block 38, the new entry is added to the database in the current data portion. Finally, at block 40, the resulting scroll position of the displayed entries is updated and the process ends and the program waits for the next addition of new data.

Figure 3:
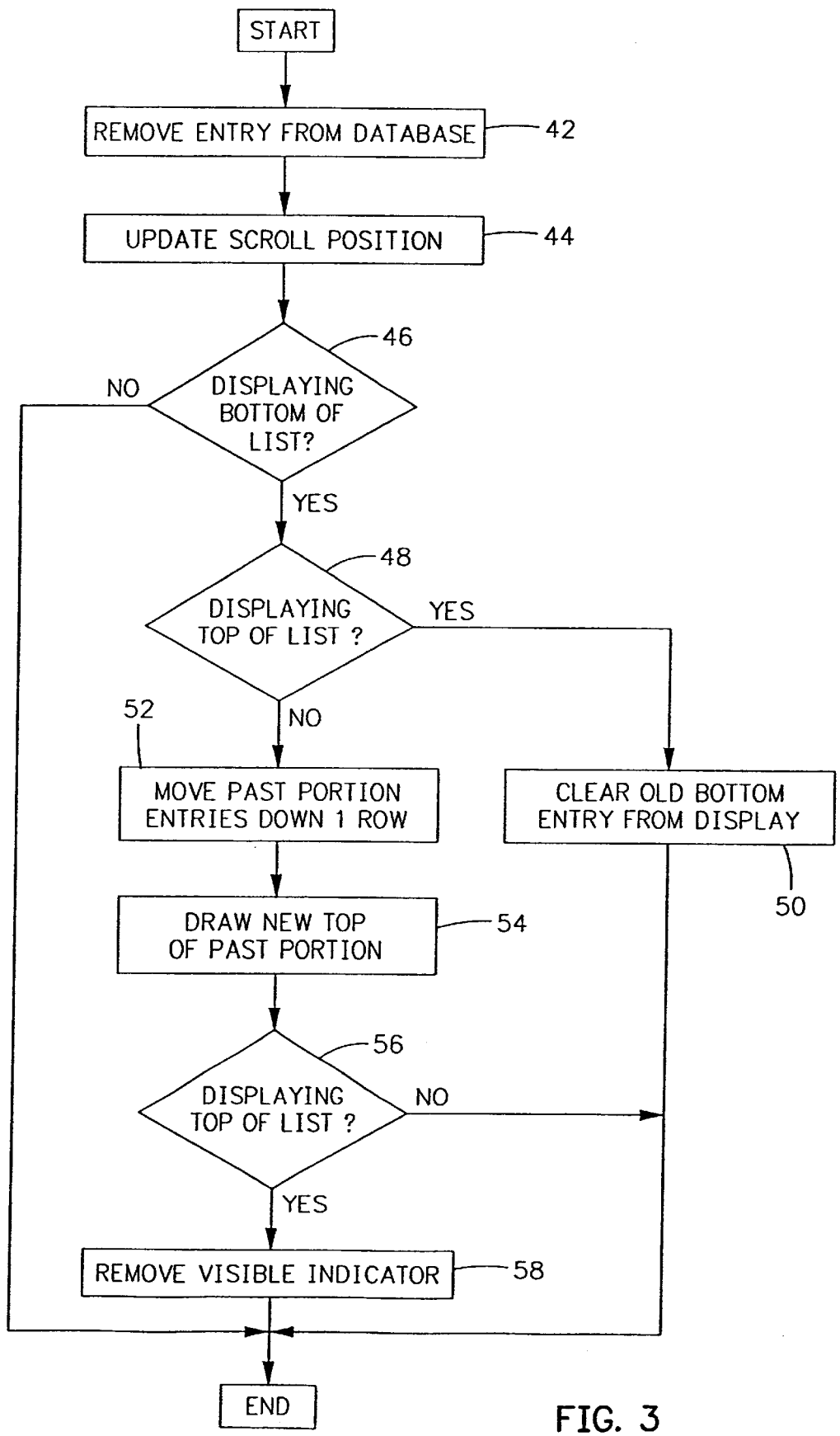
FIG. 3 is a flow diagram of the removal of historic data from a time-ordered dynamic list of data in one embodiment of the present invention.

Turning now to FIG. 3, a flow diagram of the removal of historic data from a timeordered dynamic list of data in one embodiment of the present invention is shown. When the database becomes full, for example, it is necessary to discard the oldest data to make room in the database for the new data. At block 42, the oldest entry in the database is removed from the historic data portion. At block 44, the resulting scroll position of the displayed entries is updated. At decision block 46, the program examines the current status of the past portion 16 of FIG. 1 to determine whether the bottom of the list is shown. When this is not the case, then the process ends and the program waits for the next removal of historic data.

Returning to decision block 46, when the bottom of the list is shown, then processing proceeds to decision block 48 where the program examines the current status of the past portion to determine whether the top of the list is shown. When this is the case, then at block 50 the old bottom of the list is cleared from the display and the process ends and the program waits for the next removal of historic data. Returning to decision block 48, when the top of the list is not shown, then a block 52 the entries in the past portion are moved down one row. At block 54, the new top of the past portion is drawn in as appropriate.

As a result of moving the entries down, the top of the list may now be displayed where it was not displayed previously at decision block 48 above. At decision block 56, the program examines the current status of the past portion to determine whether the top of the list is shown. When this is not the case, then the process ends and the program waits for the next removal of historic data. Returning to decision block 56, when the top of the list is shown, then at block 58, a visible indicator 22 between the present portion 14 and the past portion is removed and the process ends and the program waits for the next removal of historic data.

Figure 4:
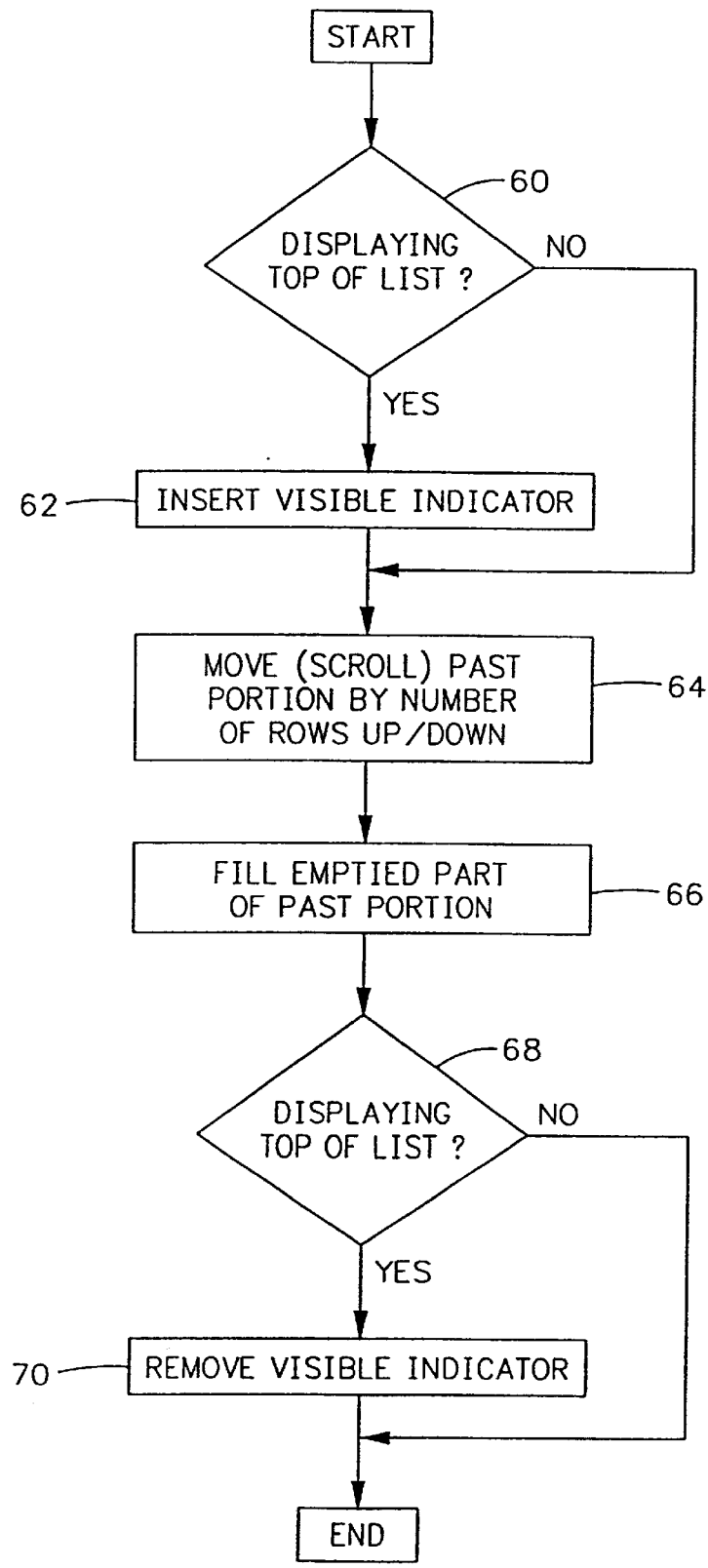
FIG. 4 is a flow diagram of the modification of the display position of a time-ordered dynamic list of data in one embodiment of the present invention.

Turning now to FIG. 4, a flow diagram of the modification of the display position of a time-ordered dynamic list of data in one embodiment of the present invention is shown. Recall from above that, depending on the vertical scroll bar 18, the upper entry being displayed in the past portion 16 will not necessarily be the top of the list. Whenever the upper entry being displayed is not the top of the list, then there is a discontinuity in time and a visible indicator 22 is provided for the user. In order to modify the display position, the need for the visible indicator needs to be evaluated. The process begins at START. At decision block 60, the program examines the status of the past portion prior to modifying the display position to determine whether the top of the list was shown. When this was not the case, then processing proceeds to block 64. When the top of the list was shown, then, at block 62 a visible indicator is inserted. At block 64, the past portion of the display is moved the corresponding number of rows as appropriate. At block 66, the rows emptied by the movement of the past portion are filled in as appropriate. At decision block 68, the program examines the current status of the past portion to determine whether the top of the list is shown. When this is not the case, then the process ends and the program waits for the next modification of the display position. Returning to decision block 68, when the top of the list is displayed, then the visible indicator is removed and the process ends and the program waits for the next modification of the display position.

One of ordinary skill in the art will realize that the flow diagrams shown in FIGS. 2–4 are specific to a window 10 where the first entry of the past portion 16 of FIG. 1 is at the top and the less recent entries are listed in decreasing order down the window. A similar process would be used if the entries started at the bottom and worked their way up, started at the left and worked their way right, and so on.

While the invention has been illustrated and described by means of specific embodiments, it is to be understood that numerous changes and modifications may be made therein without departing from the spirit and scope of the invention as defined in the appended claims and equivalents thereof.

What is claimed is:

1. A method of processing at least one time-ordered dynamic list of data having a present portion and a past portion, the dynamic list of data representing at least one database, wherein the present portion has at least one current entry and the past portion has a plurality of historic entries ordered sequentially from most recent to least recent, the at least one list is displayed in a computer display window, and a new entry is being added to the at least one list, the method comprising the steps of:

receiving a new entry for the at least one list;
   in response to the reception of the new entry:
      examining the past portion of the display to determine whether the top of the list is shown;
      when the top of the list is being shown, moving all of the entries down one place in order;
      drawing the new entry in the present portion of the display; and
      adding the new entry to the at least one database.

2. A method of processing at least one time-ordered dynamic list of data having a present portion and a past portion, the dynamic list of data representing at least one database, wherein the present portion has at least one current entry and the past portion has a plurality of historic entries ordered sequentially from most recent to least recent, the at least one list is displayed in a computer display window, and a previous entry is being removed from the at least one list, the method comprising the steps of:

when the database is full, removing the least recent entry from the database; in response to the removal of the least recent entry from the database:
      determining whether the least recent entry is being shown in the past portion of the display;
      when the least recent entry is being displayed:
         examining the past portion to determine whether the top of the list is being shown;
         when the top of the list is being shown, clearing the least recent entry from the past portion of the display;
         when the top of the list is not being shown:
            moving all of the entries in the past portion of the display down one place in order;
            drawing a new entry in the past portion of the display;
            examining the past portion to determine whether the top of the list is being shown; and
            when the top of the list is being shown, removing a visible indicator from the display.

3. A method of processing at least one time-ordered dynamic list of data having a present portion and a past portion, wherein the present portion has at least one current entry and the past portion has a plurality of historic entries ordered sequentially from most recent to least recent, the at least one list is displayed in a computer display window, and a display position is being modified for the at least one list, the method comprising the steps of:

receiving modification instructions for modifying the display position of the at least one list;
   in response to the reception of modification instructions:
      examining a past portion of the display to determine whether the top of the list was being shown prior to reception of the modification instructions for the display position;
      when the top of the list was being shown, inserting a visible indicator into the display;
      moving the past portion of the display to the modified display position in accordance with the modification instructions;

drawing entries into any and all entries emptied by the modification of the display position;

determining whether the top of the list is being shown; and when the top of the list is being displayed, removing the visible indicator from the display.

4. A computer readable medium having computer executable instructions for performing steps related to at least one time-ordered dynamic list of data having a present portion and a past portion, the dynamic list of data representing at least one database, wherein the present portion has at least one current entry and the past portion has a plurality of historic entries ordered sequentially from most recent to least recent, the at least one list is displayed in a computer display window, and a new entry is being added to the at least one list, the steps comprising:

receiving a new entry for the at least one list;

in response to the reception of the new entry:
examining the past portion of the display to determine whether the top of the list is shown;
when the top of the list is being shown, moving all of the entries down one place in order;
drawing the new entry in the present portion of the display; and adding the new entry to the at least one database.

5. A computer readable medium having computer executable instructions for performing steps related to at least one time-ordered dynamic list of data having a present portion and a past portion, the dynamic list of data representing at least one database, wherein the present portion has at least one current entry and the past portion has a plurality of historic entries ordered sequentially from most recent to least recent, the at least one list is displayed in a computer display window, and a previous entry is being removed from the at least one list, the steps comprising:

when the database is full, removing the least recent entry from the database;

in response to the removal of the least recent entry from the database, determining whether the least recent entry is being shown in the past portion of the display;

when the least recent entry is being displayed:
examining the past portion to determine whether the top of the list is being shown;
when the top of the list is being shown, clearing the least recent entry from the past portion of the display;
when the top of the list is not being shown:
moving all of the entries in the past portion of the display down one place in order;
drawing a new entry in the past portion of the display;
examining the past portion to determine whether the top of the list is being shown; and
when the top of the list is being shown, removing a visible indicator from the display.

6. A computer readable medium having computer executable instructions for performing steps related to at least one time-ordered dynamic list of data having a present portion and a past portion, wherein the present portion has at least one current entry and the past portion has a plurality of historic entries ordered sequentially from most recent to least recent, the at least one list is displayed in a computer display window, and a display position is being modified for the at least one list, the steps comprising:

receiving modification instructions for modifying the display position of the at least one list;

in response to the reception of modification instructions:
examining a past portion of the display to determine whether the top of the list was being shown prior to reception of the modification instructions for the display position;
when the top of the list was being shown, inserting a visible indicator into the display;
moving the past portion of the display to the modified display position in accordance with the modification instructions;
drawing entries into any and all entries emptied by the modification of the display position;
determining whether the top of the list is being shown; and
when the top of the list is being displayed, removing the visible indicator from the display.

* * * * *